US007639844B2

(12) United States Patent
Haddad

(10) Patent No.: US 7,639,844 B2
(45) Date of Patent: Dec. 29, 2009

(54) AIRPORT VEHICULAR GATE ENTRY ACCESS SYSTEM

(76) Inventor: Michael A. Haddad, 18945 Cross Country La., Gaithersburg, MD (US) 20879

( * ) Notice: Subject to any disclaimer, the term of this patent is extended or adjusted under 35 U.S.C. 154(b) by 311 days.

(21) Appl. No.: 11/895,656

(22) Filed: Aug. 27, 2007

(65) Prior Publication Data

US 2009/0039155 A1 Feb. 12, 2009

Related U.S. Application Data

(63) Continuation-in-part of application No. 11/220,282, filed on Sep. 7, 2005, now Pat. No. 7,401,732, and a continuation-in-part of application No. 10/330,981, filed on Dec. 30, 2002, now abandoned.

(51) Int. Cl.
*G06F 7/04* (2006.01)
*G06K 9/00* (2006.01)
*G06K 9/36* (2006.01)

(52) U.S. Cl. ....................... 382/115; 382/110; 382/125; 382/103; 382/107; 340/5.21; 340/5.52; 235/380

(58) Field of Classification Search ................. 382/115, 382/118, 110, 125, 103; 235/380, 382, 384; 340/5.21, 5.52; 713/159
See application file for complete search history.

(56) References Cited

U.S. PATENT DOCUMENTS 6,394,356 B1 * 5/2002 Zagami ...................... 235/487
7,401,732 B2 * 7/2008 Haddad ...................... 235/380
2002/0100803 A1 * 8/2002 Sehr ........................... 235/384
2003/0042315 A1 * 3/2003 Tsikos et al. ........... 235/472.01
2003/0169337 A1 * 9/2003 Wilson et al. ............... 348/156
2004/0052404 A1 * 3/2004 Houvener ................... 382/115
2004/0099731 A1 * 5/2004 Olenick et al. .............. 235/380
2004/0109588 A1 * 6/2004 Houvener ................... 382/116
2005/0093675 A1 * 5/2005 Wood et al. ................ 340/5.21
2006/0026017 A1 * 2/2006 Walker .......................... 705/1
2008/0024271 A1 * 1/2008 Oberman et al. ........... 340/5.82

OTHER PUBLICATIONS

Close Security gaps at airport vehicular gates, Astronet, Michael haddad, Avegass 2003.*
Reveel It imaging reader , a credential reader that is guaranteed to catch attention, Astronet technologies 2004.*

* cited by examiner

*Primary Examiner*—Wesley Tucker
*Assistant Examiner*—Nancy Bitar

(57) ABSTRACT

A method of securing airport vehicular gate entries by providing mechanisms to check airport employee escorting a vehicle, as well as vehicle driver and passengers and match them against the TSA NO-FLY and SELECTEE lists. The system provides means of authenticating drivers' licenses, verifying employee status, printing temporary passes, printing a temporary vehicle entry pass and certificate, providing the airport police with a handheld apparatus capable of reading the entry certificate and wirelessly verifying its authenticity. The system provides a method of allowing entry for a group of individuals escorted by an airport employee. The system provides also a method for allowing entry of multiples vehicles, escorted by one airport employee. The system is fully automated and is touch screen capable, thus requiring a minimal amount of human interaction.

11 Claims, 10 Drawing Sheets

AVIATION ADMINISTRATION

LIST UPLOAD

| | |
|---|---|
| Name: | John Doe |
| Serial Number: | 13131 |
| Upload Date: | 4/19/2007 12:53:28 PM |
| List Code | 22 |

Please be sure to print this page now for Identification purposes at the Gate of Entry

FIG. 10

AIRPORT VEHICULAR GATE ENTRY ACCESS SYSTEM

CROSS-REFERENCE TO RELATED APPLICATIONS

This application is in continuation in part of application Ser. No. 10/330,981 filed on Dec. 30, 2002 now abandoned and a continuation in part of application Ser. No. 11/220,282 filed on Sep. 7, 2005 now U.S. Pat. No. 7,401,732.

FIELD OF THE INVENTION

The invention relates to a method of securing airport vehicular entry/exit gates, using application Ser. No. 10/330,981 and its continuation in part application Ser. No. 11/220,282 information recovery device, an authentication device and other computer peripherals.

BACKGROUND OF THE INVENTION

Airport vehicular entry gates rely on human intervention and manual data entry and are prone to excessive error rates, lower security standards, increased inefficiencies and decreased reliability.

Nonetheless, securing gates often require rapid data entry to support granting access for vendors, and certain categories of employees.

Traditional logging methods involve a human attendant station, and a hand-written logbook.

BRIEF SUMMARY OF THE INVENTION

It is an objective of this invention to provide:

A method of securing vehicles entry into secured areas such as airports. Such method allows security personnel to process a vehicle entry as a group of verifiable objects interrelated, including an employee host, a vehicle registration card, a vehicle driver and vehicle passengers. Such method uses a computer system, the apparatus of application Ser. No. 11/220,282, and the software application of application Ser. No. 11/220,282 customized for the purpose, a commercial Identification card authentication apparatus, and various computer peripherals.

The present invention delivers a time-sensitive photo pass with machine-readable media and other pertinent printed information, and a temporary vehicle entry certificate to be displayed on the vehicle windshield.

The present invention provides a computerized wireless handheld for the airport police to read the encoded temporary vehicle certificate within the airport secured perimeter and wirelessly access the database to instantly verify certificate content.

The present invention also incorporates critical data on known and suspected criminals, saboteurs, and terrorists such as Transportation Security Agency supplied NO-FLY and SELECTEE lists, or any other list that could be supplied otherwise, by the US Department of Homeland Security, the Federal Bureau of Investigation and other security agencies.

In accordance with the above, the Airport Vehicular Gate Entry Access System application automatically collects data and builds visitor records that can be viewed at any time, individually or as a part of an entry group, reuses individual photo scanned from the individual identification card to be used for printing entry media, automatically checks individual credentials against the TSA terrorists lists, and subsequently displays a warning window, in case of a match, automatically checks employee ID against the airport employee database records to verify employee status, automatically prints a temporary entry pass, and automatically prints a temporary vehicle entry certificate.

BRIEF DESCRIPTION OF THE DRAWINGS

FIG. 10 is a view of the list upload certificate

DETAILED DESCRIPTION OF THE INVENTION

Description of Airport Vehicular Gate Entry System

Figure 1:
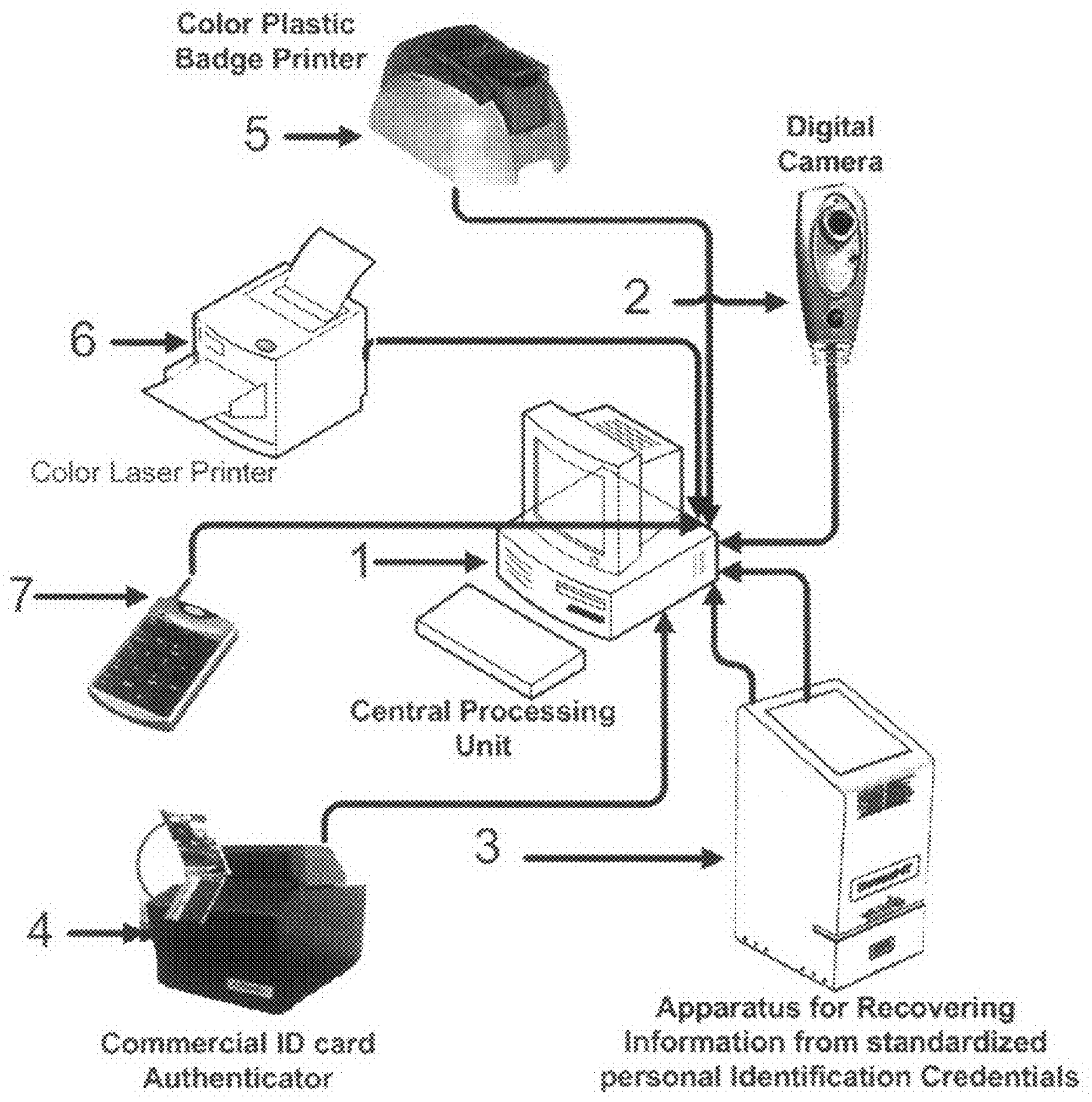
FIG. 1 is a schematic of the entry/Exit Access Control System Building block

FIG. 1 schematically illustrates the elements of an entry/exit workstation, which would be located at an airport vehicular gate booth. Each entry/exit access control system is composed of a reader for standardized personal identification credentials, 3, a suitable camera, 2, Central Processing Unit, 1, one Color Plastic Card Printers, 5, one ID card authenticator, 4, Keyboard, a laser printer, 6, and a Display Monitor.

The display monitor is preferably a touch screen LCD, however, any display monitor could be used.

An Airport Vehicular Gate Entry System is an enterprise platform where multiple airport vehicular gates comprise one workstation each, interconnected in a network configuration, controlled by a central database server. All workstations collect and store data in the central database server. In such a network, all data is immediately available at all workstations. Such a strategy permits vehicles entering from one particular gate to exit from another gate.

Figure 2:
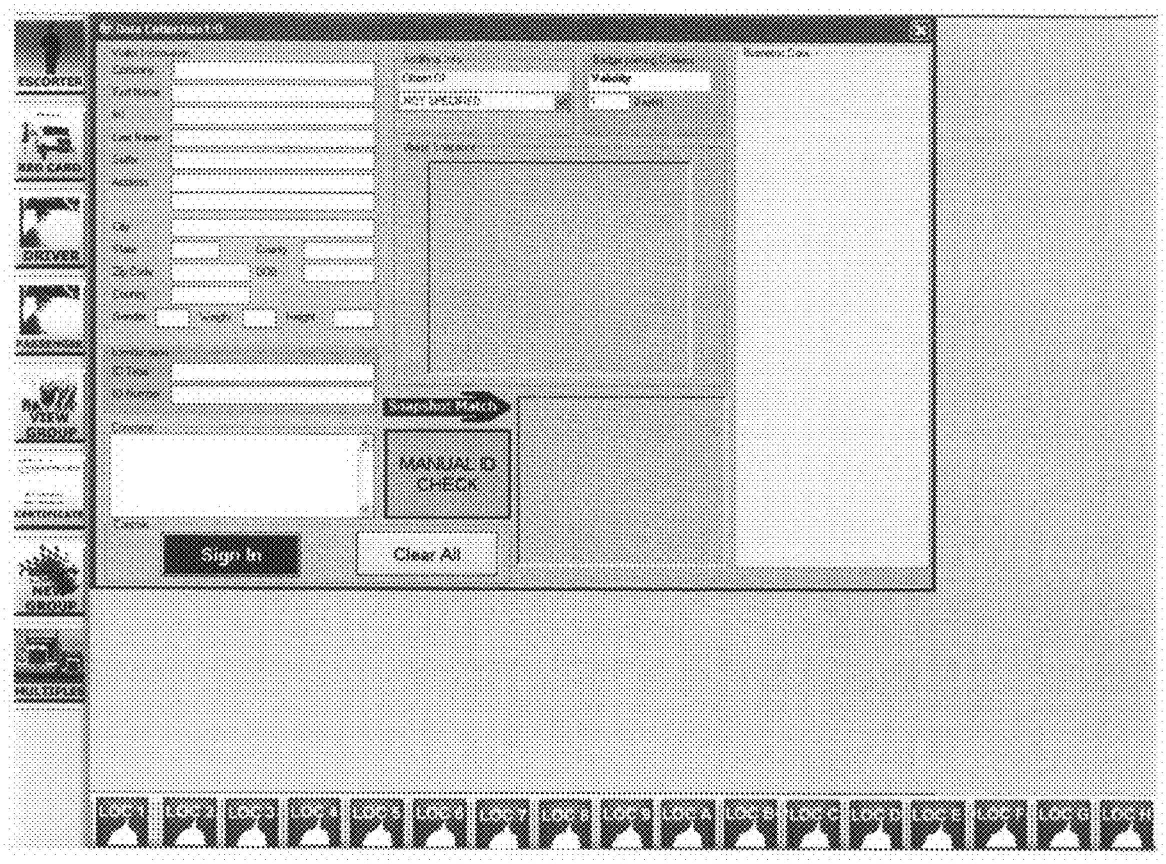
FIG. 2 is a view of the software application initial start.

FIG. 2 shows the initial startup of the system software application. A data collection form is displayed. The left touch buttons provides a mechanism to navigate through the different steps of the vehicle entry process. The bottom touch buttons provides an easy mechanism to select the vehicle destination within the airport secured perimeter.

Figure 3:
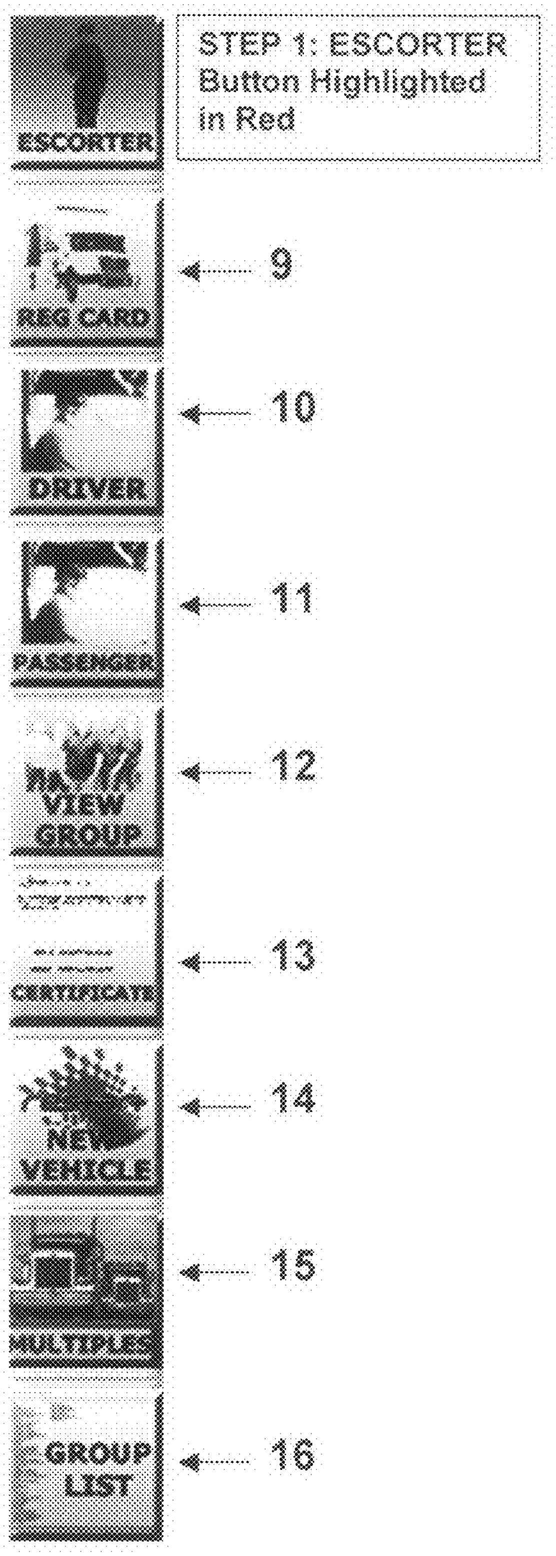
FIG. 3 is a view of the navigational buttons in ESCORTER mode.

FIG. 3 illustrates the navigation set of touch buttons, with the "ESCORTER" button, 8, highlighted in red, thus notifying the gate attendant of the system readiness to process the "ESCORTER".

For the purpose of this patent application, a vehicle entry is formed of a group of collected records, processed sequentially. Thus an entry group includes the following records:

1—ESCORTER

2—DMV Vehicle Registration Information

3—Driver Information

4—Passengers information

Upon the arrival of a vehicle at an airport vehicular entry gate, an airport employee is accompanying the vehicle as "ESCORTER". "ESCORTER" presents its airport ID to the reader for standardized personal identification credentials device, 3. Following the reading, the employee is requested to enter a security code in the numeric keypad, 7. The code is verified for accuracy against the employee database. It is rejected if not correct. The information read from the ID serves to locate the ESCORTER record in the airport employee database. The system verifies employment status. If active, the employee is matched against the TSA NO-FLY and SELECTEE lists. The system provides a security alert if the employee is:

not active matched during the TSA NO-FLY and SELECTEE lists search.

Thus, security is very much enhanced since an airport employee is always checked before entering the airport secured perimeter. Furthermore, a system security rule prohibits an airport employee from using a personal ID card to enter the airport secured perimeter.

Figure 4:
FIG. 4 is a view of the navigational buttons in Registration Card Mode
Figure 8:
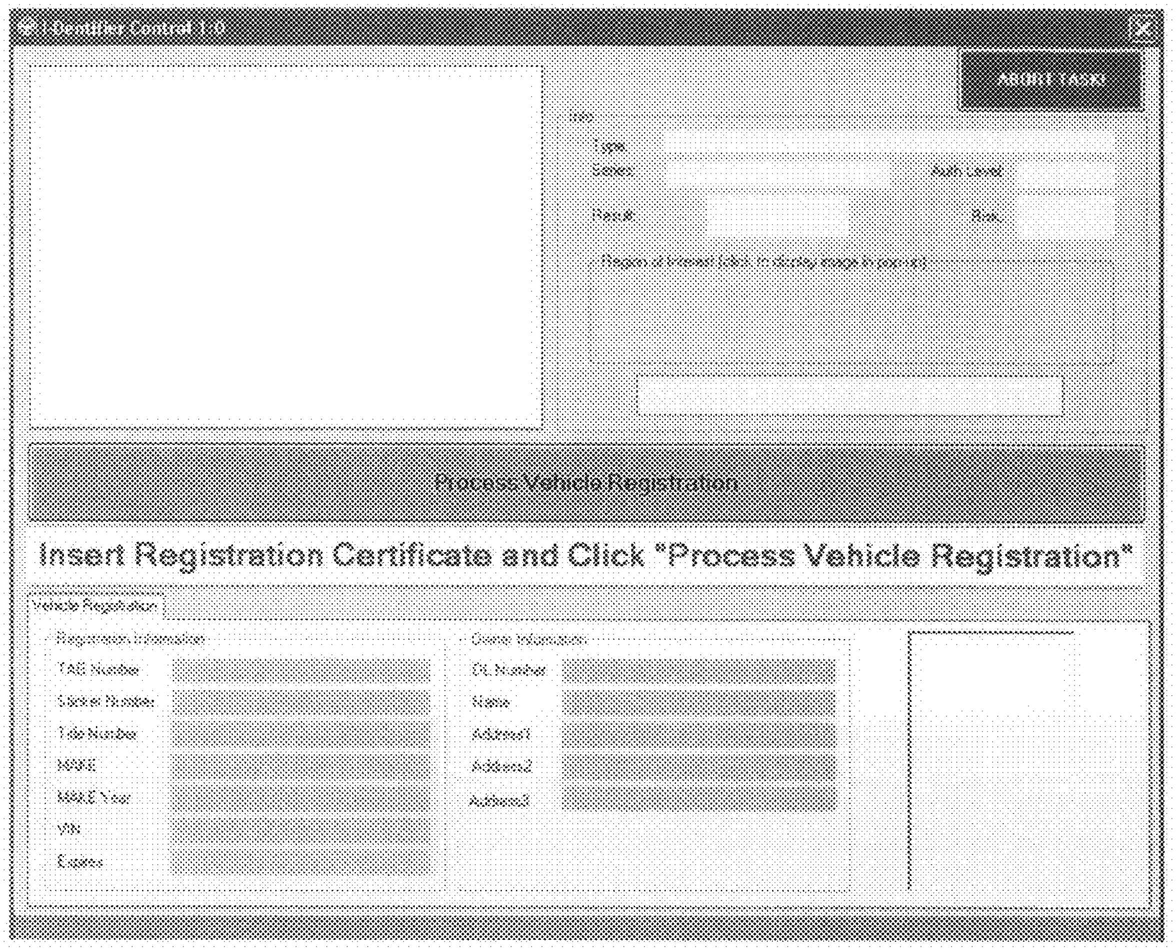
FIG. 8 is a view of the Vehicle Registration certificate processing form

After processing the employee, the employee becomes the ESCORTER of the entry group. The system automatically moves into the vehicle registration mode, as illustrated in FIG. 4. This causes the touch button labeled "REG CARD", 9, to be highlighted in red, the "ESCORTER" touch button, 8, to be highlighted in green, and the window of FIG. 8 to be displayed. The gate attendant places the DMV vehicle registration card in the authenticator, as requested by the displayed message. The authenticator acquires an image of the registration card and sends the image to the system for proceeding with character recognition. This data becomes the second record in the entry group.

Figure 5:
FIG. 5 is a view of the navigational buttons in DRIVER Mode

The system automatically moves into the DRIVER mode, as illustrated in FIG. 5. This mechanism causes the "DRIVER" touch button, 10, to be highlighted in red and the "REG CARD" touch button, 9, to be highlighted in green.

The gate attendant follows the following operational steps in the following functional sequence:

1—A credential, in this case a driver license, is presented to the reading apparatus, 3.

2—The system decodes the encoded data and encrypts the sensitive information before displaying it on the workstation monitor for verification by the station guard.

3—The system checks database information to determine whether the individual is an employee.

4—If this is an airport employee, the system rejects the ID, since an employee can only use an airport ID to enter.

5—The system proceeds by checking the ID information against the TSA NO-FLY and SELECTEE lists to determine security exposure.

6—If such checks are positive, a warning window is displayed, which requires the intervention of a security manager. The system would not admit the individual unless the security manager enters a unique security code to permit such admission.

7—The system displays a message requiring the gate attendant to insert the ID card in the authenticator apparatus. The authentication process provides a mean of determining and rating ID physical aspects security risks. The authenticator matches the ID against stored templates, and looks for the ID security features to determine the possibility of any ID tempering.

8—If all checks are negative, the process continues. The system picks up the individual photo provided by the authenticator returned record, and prints a time sensitive encoded temporary pass.

Figure 6:
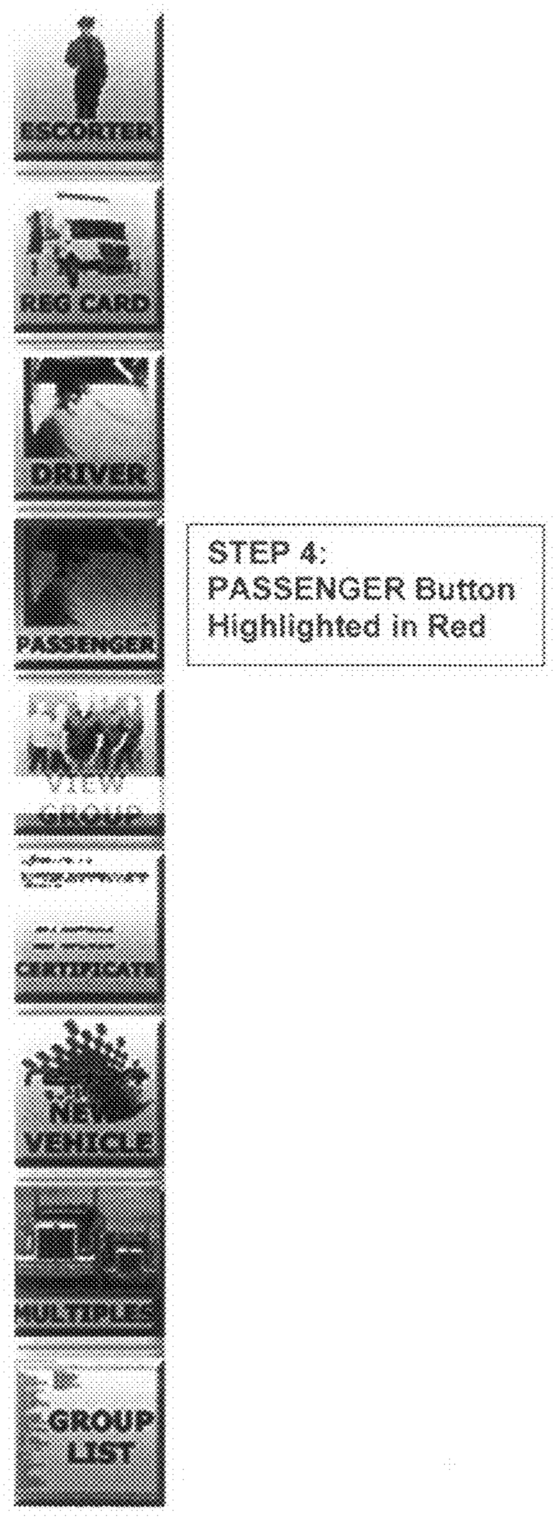
FIG. 6 is view of the navigational buttons in PASSENGER Mode

Upon completing the DRIVER entry record, the system moves automatically into the "PASSENGER" mode, as illustrated in FIG. 6. This causes the touch button "PASSENGER", 11, to be highlighted in red and the "DRIVER" touch button, 10, to be highlighted in green.

The gate attendant proceeds with collecting passengers' records, one after another, in a sequential manner, following the same functional steps mentioned earlier during the DRIVER ID processing.

Figure 7:
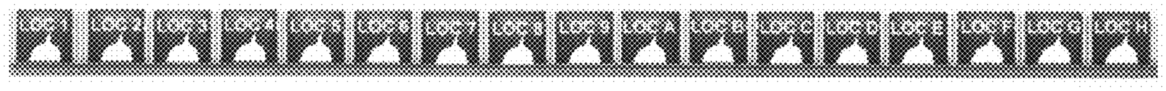
FIG. 7 is a view of the bottom vehicle destinations buttons

FIG. 7 provides an illustration of the destination touch buttons. These buttons must be customized for each airport as possible destinations within different airports vary.

Figure 11:
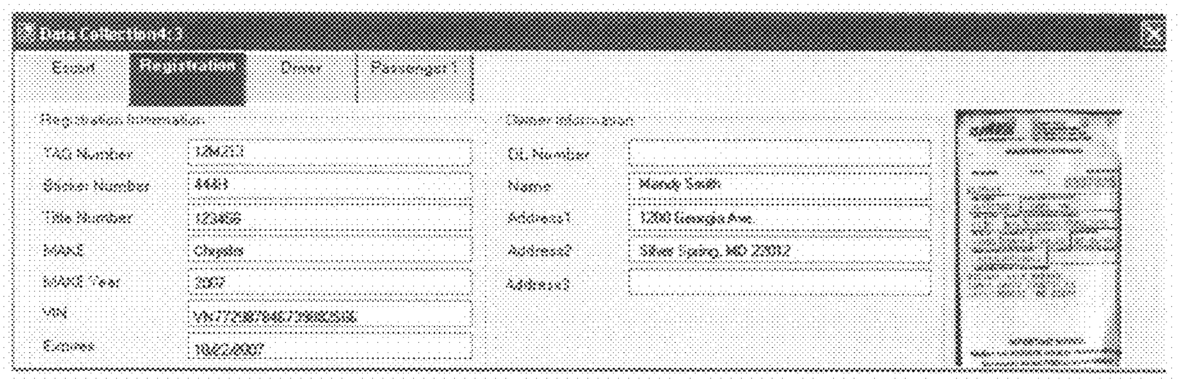
FIG. 11 is a view of the Entry Group Data

At any time, the gate attendant is able to review the records that have been collected during the entry process. "VIEW GROUP" touch button, 12, provides a mean of displaying the entry group. Entry group is displayed in a tabbed window form, as illustrated in FIG. 11.

Figure 9:
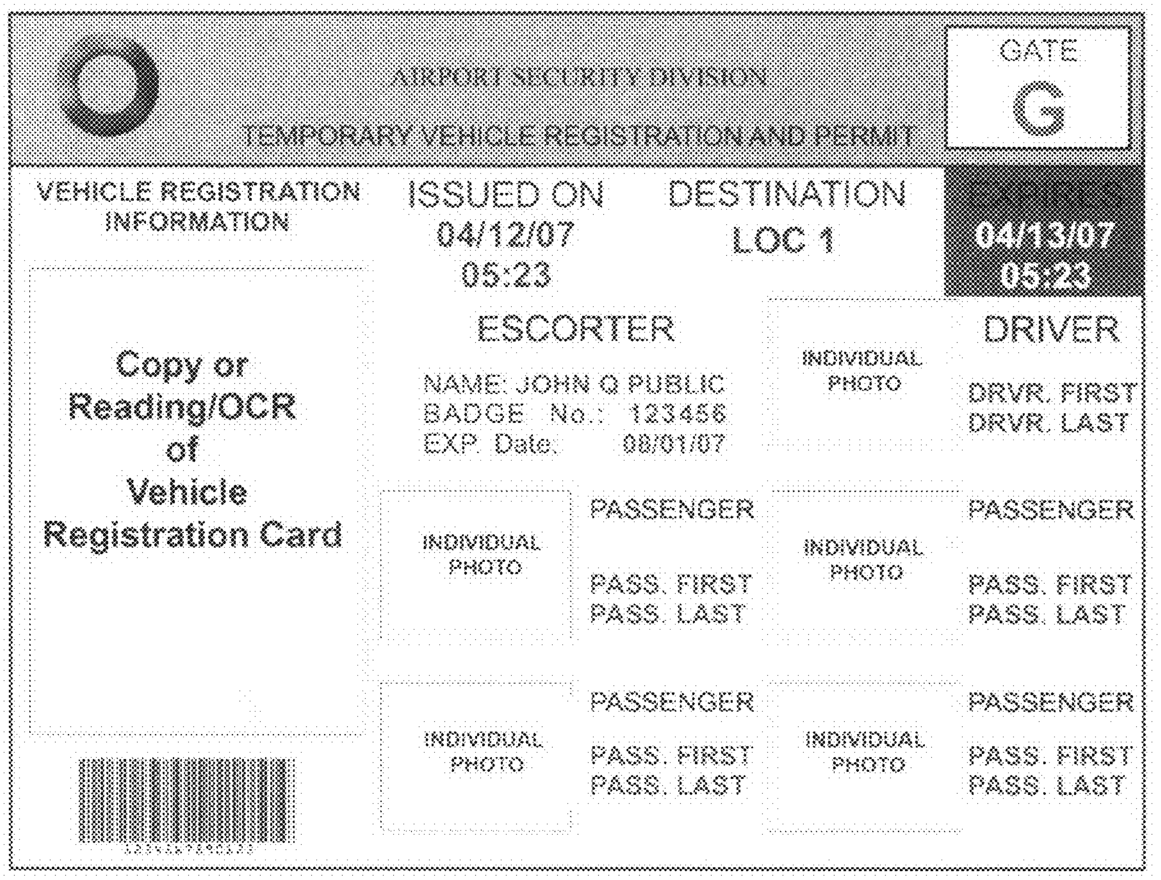
FIG. 9 is a view of the temporary vehicle entry certificate

"CERTIFICATE" touch button, 13, causes the printing of the Temporary Vehicle Entry Certificate and Permit, as illustrated in FIG. 9. The certificate includes the following information:

1—ESCORTER

2—DRIVER

3—Up to 4 PASSENGERS

4—EXPIRATION DATE

5—DESTINATION

6—ISSUE DATE

7—ENTRY Gate

8—Vehicle information

9—A barcode

10—Other.

The certificate is to be displayed at the vehicle windshield.

Figure 12:
FIG. 12 is a view of the wireless reader apparatus

A wireless handheld apparatus reader, as illustrated in FIG. 12, is provided to the airport police to read the certificate on the premises and instantly verify the displayed certificate records, through a wireless access to the system database.

"NEW VEHICLE" touch button, 14, is to be pressed at the start of each new entry group.

Multiple Vehicles—One Escorter

An ESCORTER is allowed to accompany multiple vehicles. "MULTIPLES" touch button, 15, is to be pressed for this purpose. This causes the button to be highlighted in red.

While "MULTIPLES" button is highlighted, gate attendant touches "NEW VEHICLE" button, 14. The first vehicle record is processed as above. Gate attendant touches "NEW VEHICLE" button, 14, repeatedly, for every vehicle thereafter. ESCORTER is processed only once within the first vehicle entry group and the same ESCORTER record is used as part of the following vehicle entry groups.

When there are no more vehicles to be processed within the "MULTIPLES", gate attendant touches "MUTIPLES" button to signal the end of the Multiples entry. This action causes the "MULTIPLES" button, 15, to become disabled or green.

Group of Individuals Entry

One ESCORTER may accompany a group of individuals, entering the airport secured perimeter.

The ESCORTER must upload the list of individuals through an intranet web page. The uploaded file is in a Microsoft excel format. A successful upload causes the intranet package to print an encoded upload certificate, as illustrated in FIG. 10.

At the gate, when the ESCORTER badge is read, a form is displayed allowing the upload certificate to be read and all individuals within the uploaded list are checked against the TSA NO-FLY and SELECTEE lists, thus lowering airport security exposure. Any list match is immediately highlighted.

What is claimed:

1. An automated access control system for securing airport vehicular gates and airport sterile areas comprising:

a standardized credential reader means for reading a credential encoded with personal identification to be used at entry point into the airport sterile areas and automatically collects data to build individual real time records;

a software application for recovering information from the standardized credential reader, wherein one or more of the following processing is performed:

real time records are checked searching for a credential collected information match; individual suspicious status is checked against a security list stored in a system database; employee records are checked to determine if the individual is an employee; the type of entry, visitor, employee, contractor, supplier, or vendor, is determined; and admission is processed as entry or re-entry of the individuals, an ID authenticator, wherein a credential to be authenticated is presented, a credential physical aspect and embedded security features are analyzed to determine the possibility of any tempering or forgery and provide an authenticity risk rating, said ID authenticator comprises means to read non-encoded credentials, whereas said ID authenticator generates an authentication data record comprising presented credential information and authentication rating, a central processing unit for receiving information from the standardized credential reader and the ID authenticator;

wherein, upon a credential reading, the automated access control system automatically determines the source of the credential data record, and automatically extracts personal information to be checked against a security list, TSA NO-FLY list, SELECTEE list, other alternative credentials; whereas upon the credential authentication, the automated access control system automatically extracts authentication information from the authentication data record, and subsequently displays a warning window, as a result of the individual credentials match and ID forgery risks rating contained in the authentication data record.

2. An automated access control system as claimed in claim 1, wherein When no match against the TSA No Fly and Selectee lists or any other lists exists, the automated access control system picks up the individual photo provided by the authentication data record, and prints a time sensitive encoded temporary pass.

3. An automated access control system as claimed in claim 1, wherein the standardized credential reader can read any one of: driver license identification, passports, boarding passes or any other standardized credentials presented as a personal identification upon entry into the airport, and whereas standardized credentials refer to identification documents encoded using established standards.

4. An automated access control system as claimed in claim 1, wherein the secured area can be a sterile area or any other airport secured area.

5. An automated access control system as claimed in claim 1, wherein the system database includes one or more interrelated group of records: the airport employee as ESCORTER, the DMV vehicle registration card information, the driver identification record and the passengers' identification records.

6. An automated access control system as claimed in claim 1, includes: a wireless barcode reader, a system database, a suitable camera, a color plastic card printer, a keyboard, a laser printer, an intranet package and a display monitor.

7. An automated access control system as claimed in claim 6, wherein the system can be used at an airport vehicular entry gate wherein a temporary vehicle certificate is printed that includes entry relevant information and pictures to display certificate records at the vehicle windshield.

8. An automated access control system as claimed in claim 7, wherein entry of multiple vehicles or group of individuals with one escorter is allowed.

9. An automated access control system as claimed in claim 8, wherein a wireless handheld reader is provided to airport police to read the vehicle certificate on the premises and instantly verify the displayed certificate records, through a wireless access to the system database.

10. An automated access control system as claimed in claim 1, wherein the software application uses a NIST-certified Advanced Encryption Standard, or supported symmetric cryptography, to encrypt and decrypt data.

11. An automated access control system as claimed in claim 6, wherein a list of individuals is uploaded in the database prior to entry, whereas an encoded List Uploaded form is printed, wherein at entry, and upon reading an escorter ID, the Uploaded list form is read and all individuals in the list are checked against the NOFLY list, Selectee list, and any other list.

* * * * *